(12) United States Patent
Streit

(10) Patent No.: US 9,790,568 B2
(45) Date of Patent: Oct. 17, 2017

(54) SCREW CONVEYOR MADE OF ALLOYED STEEL AND TEMPERED BY ELECTROMAGNETIC INDUCTION OR EXPOSURE TO A FLAME

(71) Applicant: Joao Augusto Streit, Cachoeira do Sul (BR)

(72) Inventor: Joao Augusto Streit, Cachoeira do Sul (BR)

( * ) Notice: Subject to any disclaimer, the term of this patent is extended or adjusted under 35 U.S.C. 154(b) by 0 days.

(21) Appl. No.: 15/159,770

(22) Filed: May 19, 2016

(65) Prior Publication Data

US 2016/0265075 A1    Sep. 15, 2016

Related U.S. Application Data

(63) Continuation of application No. PCT/BR2014/000272, filed on Aug. 8, 2014.

(30) Foreign Application Priority Data

Jan. 24, 2014    (BR) .......................... 2020140017092

(51) Int. Cl.

| | |
|---|---|
| *B65G 33/26* | (2006.01) |
| *C21D 9/00* | (2006.01) |
| *B23K 9/00* | (2006.01) |
| *C21D 9/52* | (2006.01) |
| *C21D 1/42* | (2006.01) |
| *C21D 1/52* | (2006.01) |
| *C22C 38/00* | (2006.01) |
| *C21D 9/22* | (2006.01) |

(52) U.S. Cl.
CPC .............. *C21D 9/0068* (2013.01); *B23K 9/00* (2013.01); *B65G 33/265* (2013.01); *C21D 1/42* (2013.01); *C21D 1/52* (2013.01); *C21D 9/22* (2013.01); *C21D 9/52* (2013.01); *C22C 38/00* (2013.01); *C22C 38/002* (2013.01); *B65G 33/26* (2013.01); *B65G 2207/48* (2013.01); *Y02P 10/253* (2015.11)

(58) Field of Classification Search
CPC ........ B65G 23/20; B65G 33/12; B65G 33/26; B65G 33/265; C21D 1/42; C21D 1/52; C21D 9/52; B21B 1/28
USPC .................................................. 198/676, 677
See application file for complete search history.

(56) References Cited

U.S. PATENT DOCUMENTS

| | | |
|---|---|---|
| 3,015,258 A | 1/1962 | Apel et al. |
| 5,678,440 A | 10/1997 | Hamilton |

(Continued)

FOREIGN PATENT DOCUMENTS

BR    PI0702665-0    4/2009

OTHER PUBLICATIONS

WO 2015/109376 ; PCT/BR2014/000272; International Search Report; Written Opinion.

*Primary Examiner* — James R Bidwell
(74) *Attorney, Agent, or Firm* — Patent Law Agency, LLC; Peter Ganjian

(57) ABSTRACT

A helicoid conveyor screw manufactured from alloy steel and tempered by electromagnetic induction or flame used to convey abrasive granular products in the process of screw rotation under high friction and wear. Its inventive principle is related to the method for obtaining it by alloying steel with the chemical element Boron (B) and heat treating it, which results in greater hardness and durability of the flight.

3 Claims, 1 Drawing Sheet

(56) References Cited

U.S. PATENT DOCUMENTS

| | | | |
|---|---|---|---|
| 5,863,197 A * | 1/1999 | Boy | F27D 3/08 |
| | | | 198/676 |
| 5,899,052 A | 5/1999 | Turner | |
| 6,155,705 A * | 12/2000 | Douris | B23K 9/044 |
| | | | 198/676 |
| 7,655,181 B2 | 2/2010 | Shima et al. | |
| 7,905,968 B2 | 3/2011 | Bruce | |
| 8,069,973 B2 * | 12/2011 | Wynnobel | B21H 3/12 |
| | | | 198/666 |
| 8,763,786 B2 * | 7/2014 | Uchinashi | B65G 33/265 |
| | | | 198/661 |
| 9,061,345 B2 * | 6/2015 | Hamilton | B21H 3/12 |
| 2011/0317510 A1 * | 12/2011 | Benjamin | B22F 5/106 |
| | | | 366/79 |
| 2013/0269301 A1 * | 10/2013 | Stroeder | B01J 8/0055 |
| | | | 55/434.2 |

* cited by examiner

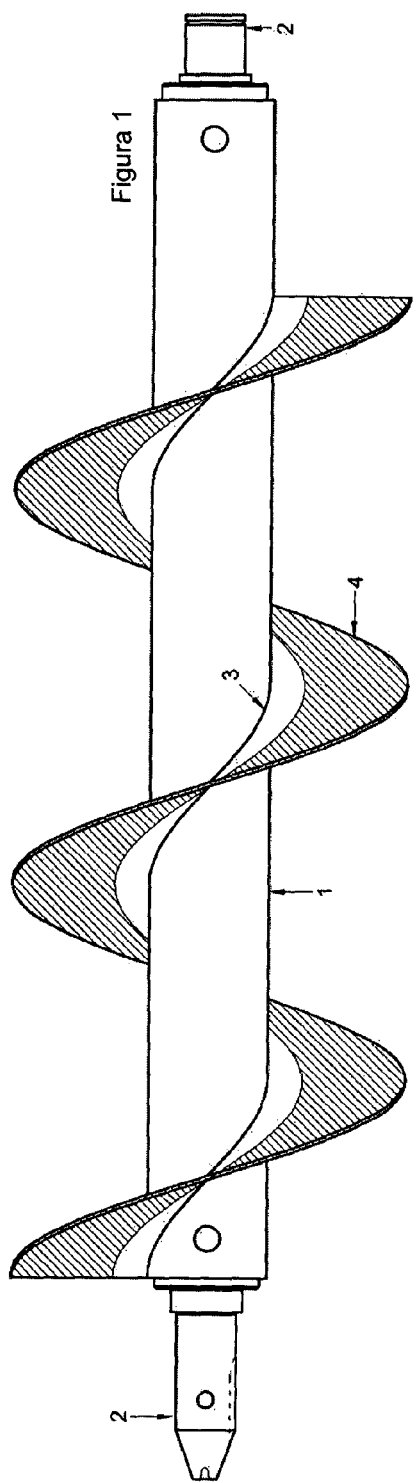
Figura 1
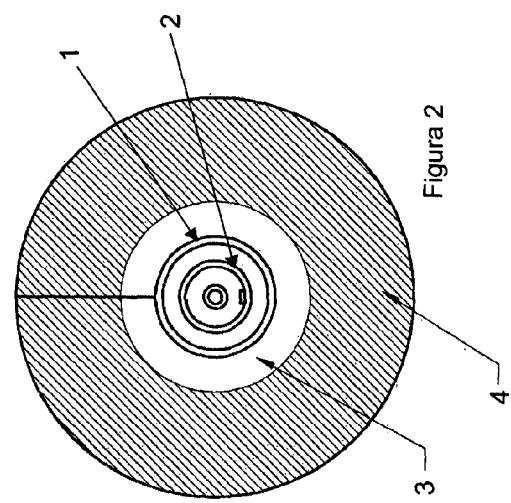
Figura 2

SCREW CONVEYOR MADE OF ALLOYED STEEL AND TEMPERED BY ELECTROMAGNETIC INDUCTION OR EXPOSURE TO A FLAME

CROSS-REFERENCE TO RELATED APPLICATIONS

This Application is a CONTINUATION application claiming the benefit of priority of the co-pending International Patent Application No. PCT/BR2014/000272 with an international filing date 8 Aug. 2014 that designated the United States, which claims the benefit of priority of Federal Republic of Brazil Application No. BR 20 2014 001709 2, filed 24 Jan. 2014, the entire disclosures of each (and all) of which Applications are expressly incorporated by reference in their entirety herein.

This utility model refers to an improvement in a helicoid conveyor screw manufactured from alloy steel and tempered by electromagnetic induction or flame. The resulting product in question is designed to convey abrasive granular products in the process of screw rotation under high friction and wear conditions.

The innovation claimed herein refers to the use of steel alloyed with Boron (B) which allows the strip to be heat treated by electromagnetic induction or flame, thus making the conveyor screw harder and, therefore, more resistant to abrasion caused by transported materials.

PRIOR ART

Boron (B) is a chemical element composed of five protons and five electrons and its atomic mass is eleven amu. It is a hard metalloid in its metallic form and a conductor only at high temperatures. Furthermore, boron is an element that cannot be found in pure form but is combined with other elements as compounds, thus forming minerals.

The tensile strength of this metalloid is higher than that of any other known chemical element; the mechanical resistance of the arc-melted material is between 1600 and 2400 MPa.

The mechanical properties of hardened boron steel make it extremely resistant to abrasive wear and particularly useful in high-resistance structural applications, prolonging the durability of structures and saving abrasion and environment-related costs.

As for the manufacturing of metallic materials, the Boron-based heat treatment when combining an alloy at a high temperature can provide the material with greater resistance to any abrasive action, thus increasing its useful life.

As for the manufacturing of helicoid conveyor screws, also known as endless helicoid screws, the common process consists of obtaining an endless cold-rolled screw as a result of squashing a carbon steel plate without alloying elements, cutting it into strips, and winding it on spools. In this process, the steel does not allow tempering without the addition of carbon. After the helicoid conveyor screw is cold rolled, it is welded onto the shaft and straightened, and then it can be mounted on a machine where it will be used.

On Aug. 24, 2007, the author filed a patent application PI0702665 claiming a method for manufacturing a conveyor screw strengthened with material on the transporting surface, said method consisting in obtaining a sheet on which there is an accumulation of steel itself, thus forming a kind of outer edge. After being subjected to a high temperature, said edge is pressed towards the plate center, leaving enough material to be cold-rolled again afterwards, thus providing hardness greater than that obtained in the common process in which plates were produced before. Said hardness is obtained by the process of hardening the molecules as a result of cold rolling to which the system is subjected.

Besides the method above, a search carried out within the INPI database of the art related to the technical field of this invention produced only indirect methods for manufacturing conveyor screws for silos, none of which mentions how the conveyor screw itself is made, as well as other processes that disclose a method for obtaining screws by cold rolling, which differs from the subject matter hereof.

That said, no helicoid conveyor screw capable of providing greater durability due to its high resistance resulting from heat treatment of boron steel alloy is known in the prior art.

IMPROVEMENT PROPOSED

Due to considerations related to prior art, this application provides an improvement to a helicoid conveyor screw manufactured from alloy steel and tempered by electromagnetic induction or flame, consisting of a strip of steel combined with the chemical element Boron (B), which is at first cold rolled and shaped into a helicoid. Then, the workpiece is heat treated by electromagnetic induction or flame, thus rigidifying the combined metal alloy and making the workpiece harder. In this process, an inner edge is left untreated so that the conveyor screw can be welded onto the mounting shaft. When subjected to the same operational conditions, the resulting product will increase the useful life of a screw conveyor up to 10 times. This equipment is used to convey products in machines for harvesting abrasive grains, machines that are in contact with soil, ore conveyors, conveyors for transporting petrochemical products, wood products, machines used in recycling industry, asphalt industry, soil drilling machines, etc.

BRIEF DESCRIPTION OF THE FIGURES

This utility model will be better understood from the drawings representative of a helicoid screw manufactured from alloy steel and tempered by electromagnetic induction or flame such that the subject matter can be easily reproduced by proper technique, thus allowing full implementation of the functionality of the subject matter claimed herein.

The specification is based on the drawings that show the best or preferred mode of implementing the designed product through detailed and consecutive numbering which clarifies the aspects that may be implied by the adopted depiction so as to determine clearly the scope of protection claimed herein.

The drawings are merely illustrative and may vary since they do not deviate from the principle initially claimed herein.

FIG. 1 is a front view of the proposed utility model.
FIG. 2 is a view from above of the proposed utility model.

DETAILED DESCRIPTION

A helicoid conveyor screw manufactured from alloy steel and tempered by electromagnetic induction or flame comprises a mounting shaft (1) having actuation fittings (2) arranged at its ends, wrapped by a tempered helix (4) welded onto its inner edge (3), thus shaping the flight.

A helicoid conveyor screw manufactured from alloy steel and tempered by electromagnetic induction or flame wherein the technical difference obtained by the product is related to the mechanical properties of hardened Boron steel, making it extremely resistant to abrasive wear and especially useful in high resistance structural applications, thus prolonging the durability of the structures and saving abrasion and environment-related costs.

The invention claimed is:

1. A helicoid conveyor screw, comprising:
 a mounting shaft having ends that include actuation fittings, and
 a tempered helix with a non-tempered inner edge that is wrapped and welded to the mouthing shaft;
 wherein: the helix is comprised of an alloy steel tempered by electromagnetic induction or flame.

2. A helicoid conveyor screw as in claim 1, wherein: the alloy steel has a combination of Boron (B) and steel.

3. A method for obtaining a helicoid conveyor screw comprising:
 combining alloy steel and Boron to form a Boron steel alloy,
 cutting the combined Boron steel alloy into long strips
 cold rolling the strips into a flight,
 tempering outer surfaces of the flight by electromagnetic induction or flame to increase hardness of flight as a result of reactive process of the Boron steel alloy combination at a high temperature wherein: an inner edge of the flight is not tempered by electromagnetic induction or flame.

* * * * *